United States Patent
Gordon et al.

(10) Patent No.: US 10,898,811 B2
(45) Date of Patent: Jan. 26, 2021

(54) METHODS FOR PROVISIONING AND MANAGEMENT OF GAMER ACCOUNTS FOR E-TOURNAMENTS

(71) Applicant: MICROSOFT TECHNOLOGY LICENSING, LLC, Redmond, WA (US)

(72) Inventors: Ariel Gordon, Mercer Island, WA (US); Sarat Chandra Subramaniam, Bellevue, WA (US); Benjamin Richard Vincent, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 149 days.

(21) Appl. No.: 16/204,999

(22) Filed: Nov. 29, 2018

(65) Prior Publication Data
US 2020/0171390 A1  Jun. 4, 2020

(51) Int. Cl.
*H04L 29/06* (2006.01)
*A63F 13/71* (2014.01)

(52) U.S. Cl.
CPC .............. *A63F 13/71* (2014.09); *H04L 63/08* (2013.01); *H04L 63/102* (2013.01)

(58) Field of Classification Search
CPC ......... H04L 63/102; H04L 63/08; A63F 13/71
See application file for complete search history.

(56) References Cited

U.S. PATENT DOCUMENTS

| | | | |
|---|---|---|---|
| 2002/0126846 A1* | 9/2002 | Multerer | A63F 13/12 380/251 |
| 2006/0121992 A1* | 6/2006 | Bortnik | A63F 13/537 463/43 |
| 2016/0291989 A1* | 10/2016 | Spitzer | G06F 8/77 |

FOREIGN PATENT DOCUMENTS

| | | |
|---|---|---|
| WO | 2007058740 A1 | 5/2007 |
| WO | 2015081022 A1 | 6/2015 |

OTHER PUBLICATIONS

"International Search Report and Written Opinion Issued in PCT Application No. PCT/US2019/061335", dated Feb. 13, 2020, 12 Pages.
Peyrott, Sebastian, "What is and How does Single Sign on Authentication Work?", Retrieved From: https://auth0.com/blog/what-is-and-how-does-single-sign-on-work/, Sep. 23, 2015, 11 Pages.

\* cited by examiner

*Primary Examiner* — Harunur Rashid
(74) *Attorney, Agent, or Firm* — Workman Nydegger

(57) ABSTRACT

Authenticating an E-tournament identity using personal identity credentials. A method includes determining that a gaming device is configured for use in an E-tournament. The method further includes receiving from the device, user personal identity credentials. As a result, the method further includes, signing in to an E-tournament identity using the personal identity credentials.

20 Claims, 7 Drawing Sheets

METHODS FOR PROVISIONING AND MANAGEMENT OF GAMER ACCOUNTS FOR E-TOURNAMENTS

BACKGROUND

Background and Relevant Art

E-tournaments are online computer game competitions. That is, various contestants will assemble, either at a given location, or virtually through network connections to compete against each other playing a computer game. Most E-tournaments require contestants to connect to an online gaming server, with some sort of user identity. Typically, these user identities are generated specifically for the E-tournament, and thus are generic with respect to a particular contestant. One difficulty of organizing these E-tournaments is managing the online identities of contestants.

Most if not all contestants already have an online identity. For example, contestants may have an account with Microsoft Corporation of Redmond, Wash. that they use to sign in to Xbox Live. However, these accounts have points, credits, game achievements that might give contestants a competitive advantage if they were allowed to bring these items to the E-tournament. To level the playing field, contestants are usually required to start fresh, which means getting a brand new online account for the E-tournament instead of using their own. This is costly, time consuming, and inconvenient for organizers and/or contestants. For example, a user may be presented with a user interface which requires a contestant to manually locate and enter some unfamiliar user name and/or password.

Additionally, often gamers have worked to develop a "brand." That is, there are many gamers who are well known and have recognizable avatars, gamer tags, etc. If a gamer chooses to become a contestant in an E-tournament, the gamer will have to compete using a generic avatar, gamer tag, or other personalized attributes. Thus, the user interface will not be able to display these personalized elements for a game contestant in an E-tournament.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in an E-tournament gaming environment. The method includes acts for authenticating an E-tournament identity using personal identity credentials. The method includes determining that a gaming device is configured for use in an E-tournament. The method further includes receiving from the device, user personal identity credentials. As a result, the method further includes, signing in to an E-tournament identity using the personal identity credentials.

Another embodiment includes a method of importing at least one of personal identity attributes or achievements to an E-tournament. The method includes identifying allowed attributes or achievements for a personal identity of a contestant in an E-tournament. The method further includes applying the identified attributes or achievements to an E-tournament identity for the contestant in the E-tournament.

Another embodiment includes a method of exporting achievements achieved by an E-tournament identity achieved in an E-tournament to a personal identity. The method includes identifying achievements achieved during an E-tournament by a contestant using an E-tournament identity. The method further includes exporting the achievements to a personal identity for the contestant.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
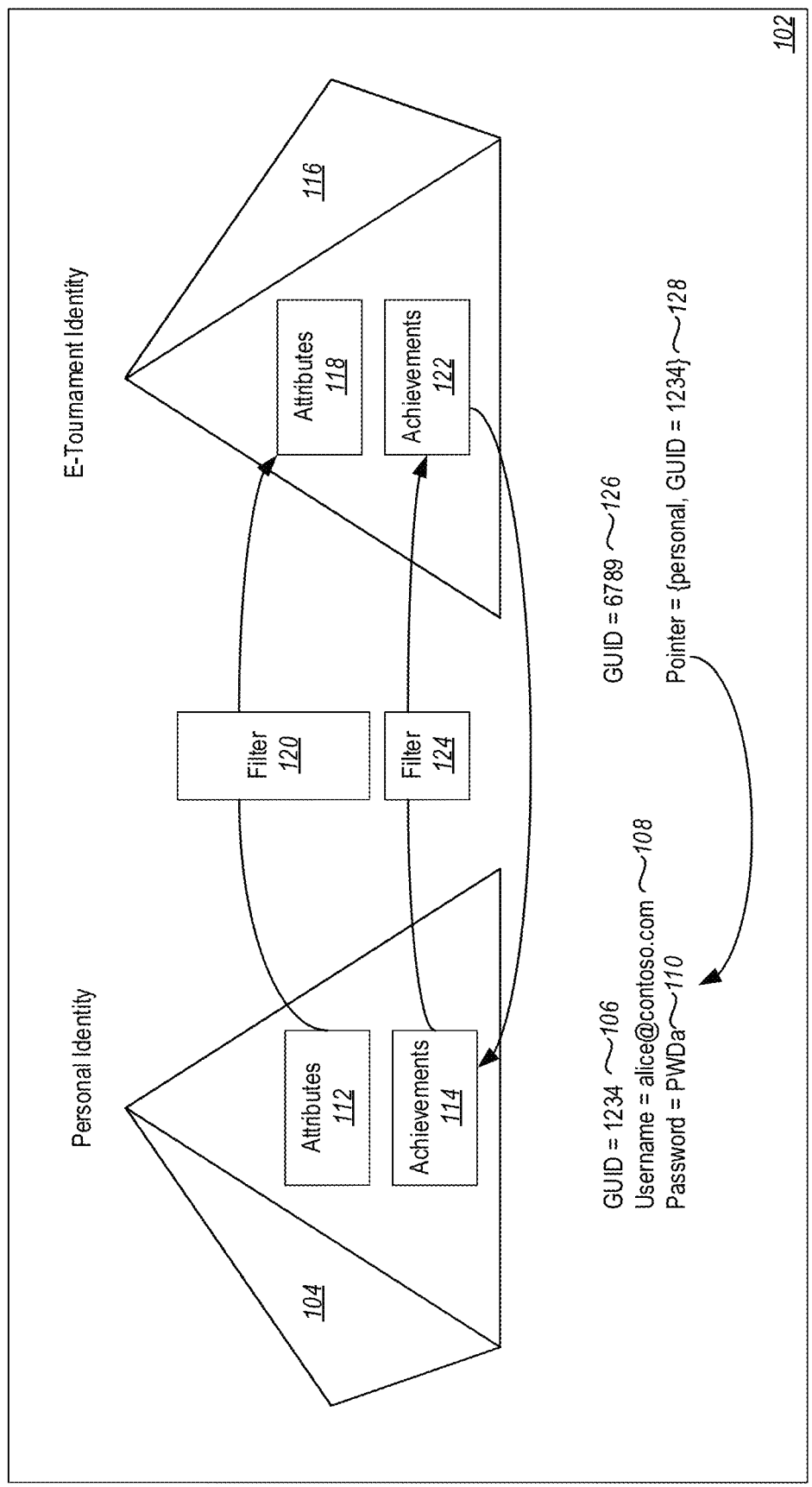
FIG. 1 illustrates a gaming server including personal identities and E-tournament identities.

Embodiments illustrated herein are directed to allowing a participant at an E-tournament to use their personal identity credentials to authenticate to an E-tournament identity for use in competing in an E-tournament. In particular, an E-tournament identity can be associated with a personal identity of a gamer. The gamer can then use their own personal identity credentials, such as their own username and password, to authenticate the E-tournament identity to participate as a contestant in the E-tournament.

Note that in an E-tournament there is a desire to maintain a level playing field. Thus, there may be limitations on which attributes and achievements from the gamer's personal identity that the gamer is allowed to have applied to the E-tournament identity. For example, if a gamer has certain achievements that would give them an advantage in gameplay, then those achievements will not be allowed to be applied to the E-tournament identity for the gamer for the E-tournament. However, certain attributes such as avatars, names, or other noncompetitive flare can be applied to the E-tournament identity for the E-tournament. In this way, contestants can still present their "brand" in an E-tournament so that the contestants are recognized by fans, other competitors, or others, while not having any sort of competitive advantage from previously acquired achievements associated with their personal identity.

In some embodiments, an organizer of an E-tournament will provision user accounts for the contestants in their own "tournament" tenant, configured as guest user accounts, meaning that these accounts are going to be mapped to external user identities.

In some such embodiments, the contestants will link their existing gaming accounts to the E-tournament accounts. This can be done when they sign up for the E-tournament, when they arrive at the E-tournament, or any time in between.

Devices, such as gaming consoles or computers used for the E-tournament are configured to sign users in to this special tenant, even if they use external identities.

Consider for example a gamer whose personal Xbox Live online ID is kelly@contoso.com. When playing on her own console at home, Kelly signs in to this account and accesses her gaming profile. When Kelly signed up for the E-tournament, she provided her personal online ID. The organizer created a contestant account for Kelly, for example called contestant123@contosotournament.com but did not create any credentials for it. Instead, this account was created with an alternate security identifier that points to Kelly's personal online ID.

Subsequently, the gaming consoles or computers at the E-tournament are configured to sign users into the E-tournament tenant. For example, if they are using Azure Active Directory, available from Microsoft, Corporation of Redmond, Wash., this would mean configuring the consoles/PCs to sign users in to https://login.microsoftonline.com/tournament.com/ instead of https://login.microsoftonline.com/common/.

When Kelly shows up for the E-tournament, she can sign in to the console with her existing personal online ID credentials. The identity system validates Kelly's credentials but does not issue a token that represents Kelly as her own self. Instead, it recognizes that the online gaming server needs a token that represents Kelly in the E-tournament tenant. It proceeds to find the matching account contestant123@contosotournment.com that has the matching alternative security identifier value. It then issues a token that represents Kelly as the contestant123@contosotournament.com identity.

As a result, Kelly has been able to use her own credentials instead of learning something new. And during the E-tournament she is signed in to her specially created tournament account instead of her own personal account. She can play the game as a brand new user, unencumbered by any previous gaming points/data.

This can greatly reduce the cost and complexity of managing contestants' identities for E-tournaments. One of the key difficulty of organizing E-tournaments is managing identities for contestants. Most if not all contestants already have an online identity—for example a Microsoft account they use to sign in to Xbox Live. However, these accounts have points, credits, game achievements that contestants cannot bring in to the E-tournament. To level the playing field, contestants are usually required to start fresh, which means getting a brand new online account for the competition instead of using their own. This is costly and time consuming for organizers and/or contestants. Some embodiments of the invention dramatically reduce this process.

Some embodiments implement an improved computing system that allows a user to log into an E-tournament account using personal credentials. Embodiments may implement an improved computing system that implements gaming identities that can compete in an E-tournament where the gaming identities have attributes and/or achievements that do not convey additional advantage to the identities where the attributes and/or achievements are imported from personal identities. Thus, an improved user interface can be implemented where previously generic identities can display attributes and/or achievements that do not convey a competitive advantage for identities, such that gameplay in an E-tournament is fair, according to some predetermined rules, but with identities displayed in a personalized way in the game play for individual competitors.

Referring to FIG. 1, an example is illustrated. FIG. 1 illustrates a gaming server 102. The gaming server 102 stores identities for gamers. Often, a gaming server will be for a particular game, type of console, and/or other gaming entity. In the example illustrated in FIG. 1, a personal identity 104 is illustrated. Note that the gaming server 102 will store a large number of identities, which may include personal identities for various gamers as well as E-tournament identities generated specifically for particular E-tournaments. Thus, while a single personal identity 104 is illustrated, it should be appreciated that multiple personal identities will be stored on the game server 102. The personal identity is associated with a globally unique identifier 106. The globally unique identifier 106 is an identifier that is particular to the personal identity 104. Other personal identities will be associated with a different globally unique identifier. Similarly, the E-tournament identities will also be each associated with their own globally unique identifier, as will be illustrated in more detail below.

The personal identity 104 is also associated with a username 108 and password 110. In this example, the username 108 for the personal identity 104 is Alice@contoso.com. The password 110 for the personal identity 104 is PWDa. The personal identity 104 has certain attributes 112 and achievements 114 associated with the personal identity 104. Generally, attributes define certain attributes about the identity. For example, one attribute in the attributes 112 may be a gamer tag for a gamer associated with an identity. Another attribute may be an avatar for the identity. Another attribute may be an age and/or birthdate. Another attribute may be a gender. Another attribute may be a location. Various other attributes, though not enumerated here, may be included in attributes for identities, such as the attributes 112 for the personal identity 104. Generally, attributes offer no competitive advantage in a gaming competition. Rather, they are simply descriptors of characteristics of the personal identity itself and/or the gamer associated with personal identity. Thus, there is rarely any competitive advantage that would be conveyed to a participant in an E-tournament by having their attributes associated with their personal identity imported and associated with their E-tournament identity.

In contrast, achievements, such as the achievements 114 for the personal identity 104, may often times convey a competitive advantage. For example, as a gamer progresses through a game, they earn achievements which are often correlated with advanced capabilities in a game. For example, having obtained certain achievements by and through previous gameplay may convey to a character associated with an identity, associated with the achievements, additional speed, strength, clairvoyance, weapon effectiveness, additional weapons, shielding, various levels of shielding, and other advantageous characteristics. Thus, it is often unfair to allow achievements to be applied from a personal identity to an E-tournament identity, as that would convey an unfair advantage in a tournament where all players are intended to begin on an even playing field. Thus, embodiments may be implemented to prevent application of all, or at least certain, achievements from a personal identity to achievements in an E-tournament identity.

Note however, certain achievements do not convey additional advantage. For example, consider a case where an achievement may simply allow certain flair, nonfunctional clothing, nonfunctional implement decoration, etc. to be applied to avatars or other attributes. In this case, no competitive advantage would be conveyed if a contestant were allowed to import personal nonfunctional achievements from their personal identity to their E-tournament identity. Thus, some embodiments may allow for importing such achievements from a personal identity such as the personal identity 104 to the E-tournament identity 116.

Thus, as illustrated in FIG. 1, attributes 112 from the personal identity 104 of the gamer may be imported into attributes 118 of an E-tournament identity 116 for the gamer. Note that a filter 120 may be applied to remove any attributes that should not be imported into the E-tournament identity 116. For example, if certain attributes in the attributes 112 contain offensive language, images, or other objectionable subject matter, an E-tournament organizer can configure filter 120 to filter those items such that they are not applied to the attributes 118 of the E-tournament identity 116 so as to prevent presentation of those attributes during the E-tournament. Alternatively or additionally, the filter 120 may be configured to filter any attributes which convey a competitive advantage to a contestant. Alternatively or additionally, if there is a desire to prevent advertising, or other content, the filter 120 can be applied to the attributes 112 to prevent any non-allowed attributes from being applied to the attributes 118 for the E-tournament identity 116.

Similarly, as illustrated in FIG. 1, achievements 114 may be imported into the achievements 122 of the E-tournament identity. However, as noted previously, it may be desirable to prevent any achievements at all from being transferred from a personal identity to an E-tournament identity. Thus, some embodiments implement a filter 124 which prevents some or all achievements from being transferred from a personal identity to an E-tournament identity. Alternatively, embodiments may simply not include functionality for importing achievements from identity to identity.

In some embodiments, the filter 124 is a total filter preventing any achievements from being transferred from the personal identity to an E-tournament identity. Alternatively, filter 124 may be configured to allow certain achievements to be transferred from a personal identity to an E-tournament identity. For example, any functional achievements may be prevented from being imported from the personal identity 104 to the E-tournament identity 116. The filter 124 may allow nonfunctional achievements to be transferred from the personal identity 114 to the achievements 122 of the E-tournament identity 116.

Note that some embodiments may allow for achievements achieved during an E-tournament to be transferred back from an E-tournament identity to a personal identity. Thus, for example, if during the E-tournament, the contestant associated with the determined identity is able to obtain certain achievements, such as collecting weapons, collecting points, collecting money, collecting armor, collecting experience, or other achievements, those achievements may be transferred from the achievements 122 of the E-tournament identity 116 to the achievements 114 of the personal identity 104. This allows the contestant to improve their reputation (or other traits or attributes) using achievements gained while participating in the E-tournament.

Note that in some embodiments, special achievements may be created especially for a particular E-tournament. For example, in some embodiments, an achievement may be earned for winning the particular E-tournament. This would become a part of the achievements 122 associated with the E-tournament identity. At the conclusion of the E-tournament, or even as the achievements are achieved, these achievements could be transferred back to the achievements 114 of the personal identity 104. In this way, users may now be able to obtain achievements that were never able to be obtained previously. In particular, an achievement for winning a particular tournament using a different identity than their personal identity would not have been able to be applied to their personal identity as a different identity was used to obtain the achievement. However, some embodiments of the invention allow achievements earned using a different identity to be applied to a primary identity, such as the personal identity 104, for the gamer. In particular, the gaming server 102 may transfer data from the personal identity to the E-tournament identity.

The following now illustrates how a gamer can use their personal identity to authenticate to an E-tournament identity. In particular, as noted in FIG. 1, the E-tournament identity is associated with a globally unique identifier 126. Additionally, rather than being associated with a username and password, the E-tournament identity 116 is associated with a pointer 128. In this particular example, the pointer 128 points to the globally unique identifier 106 of the personal identity 104. As will be illustrated in more detail below, when a contestant wishes to authenticate to the E-tournament identity 116, the contestant will enter their own personal credentials, including their own personal username and password. The pointer 128 to the personal globally unique identifier 106 will be followed, and the entered username and password will be used to attempt to authenticate to the personal identity 104. If this succeeds, the user is authenticated by the server 102 to the E-tournament identity 116.

When a user accesses a device, such as a gaming console, the device will need to know whether to use the identity credentials as entered, or whether to follow pointer 128 to use the identity credentials to log in to a different identity, to allow access to an identity. Thus, for example, the device will need to know when the user enters credentials when the user is attempting to authenticate to the E-tournament identity 116 that a pointer should be followed to the user's personal identity 104. This can be accomplished by configuring a device to use the pointer 128 as illustrated. An example is illustrated in FIG. 2.

Figure 2:
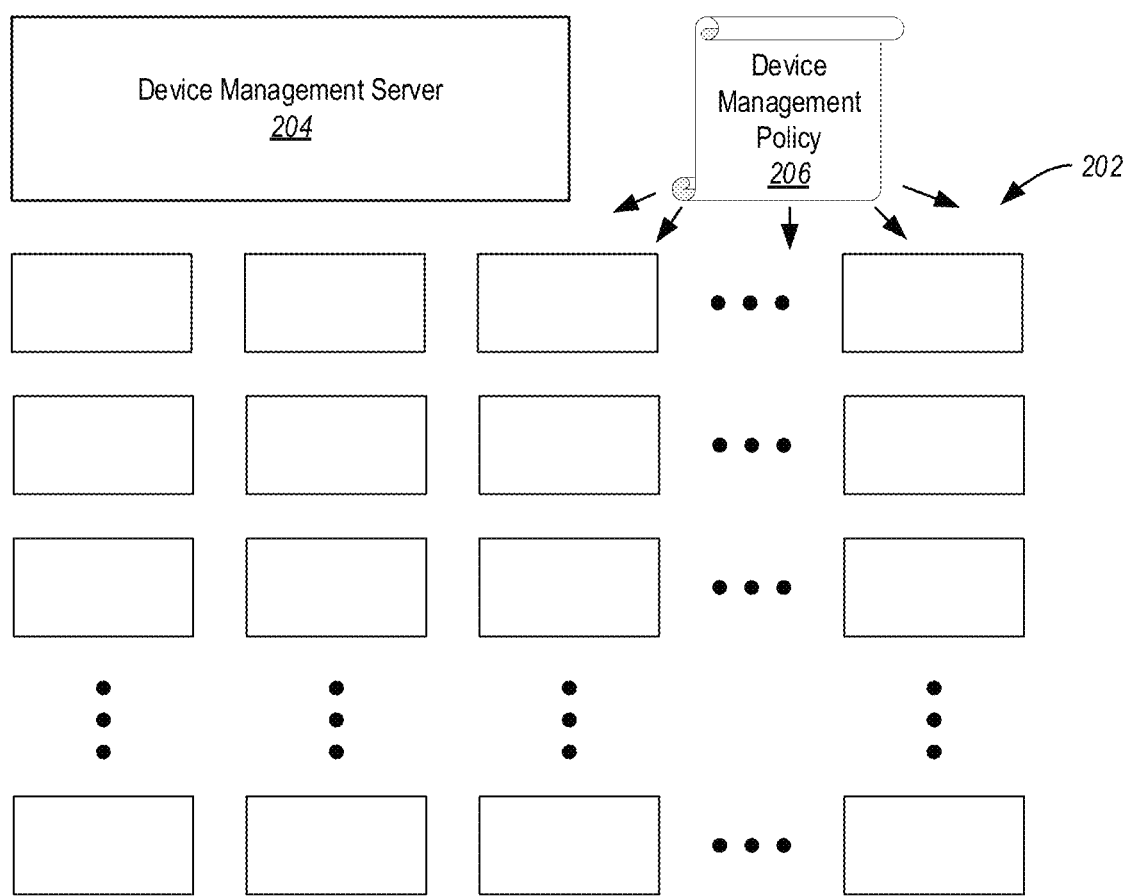
FIG. 2 illustrates a set of gaming devices used for an E-tournament.

FIG. 2 illustrates a set of devices 202. The set of devices may be, for example, various gaming consoles that have been acquired for an E-tournament. Thus, there is a desire to configure all of the devices in the set of devices 202 to use pointers to personal identities when authenticating to E-tournament identities. In some embodiments, this may be accomplished using a device management server 204 which distributes device management policy 206 to the devices in the set of devices 202. For example, this can be accomplished using various mobile device management (MDM) servers for distributing MDM policy. In particular, the device management policy 206 distributed to the devices in the set of devices 202 may include one or more policies that force the devices in set of devices 202 to use pointers when authenticating identities on the devices.

Figure 3:
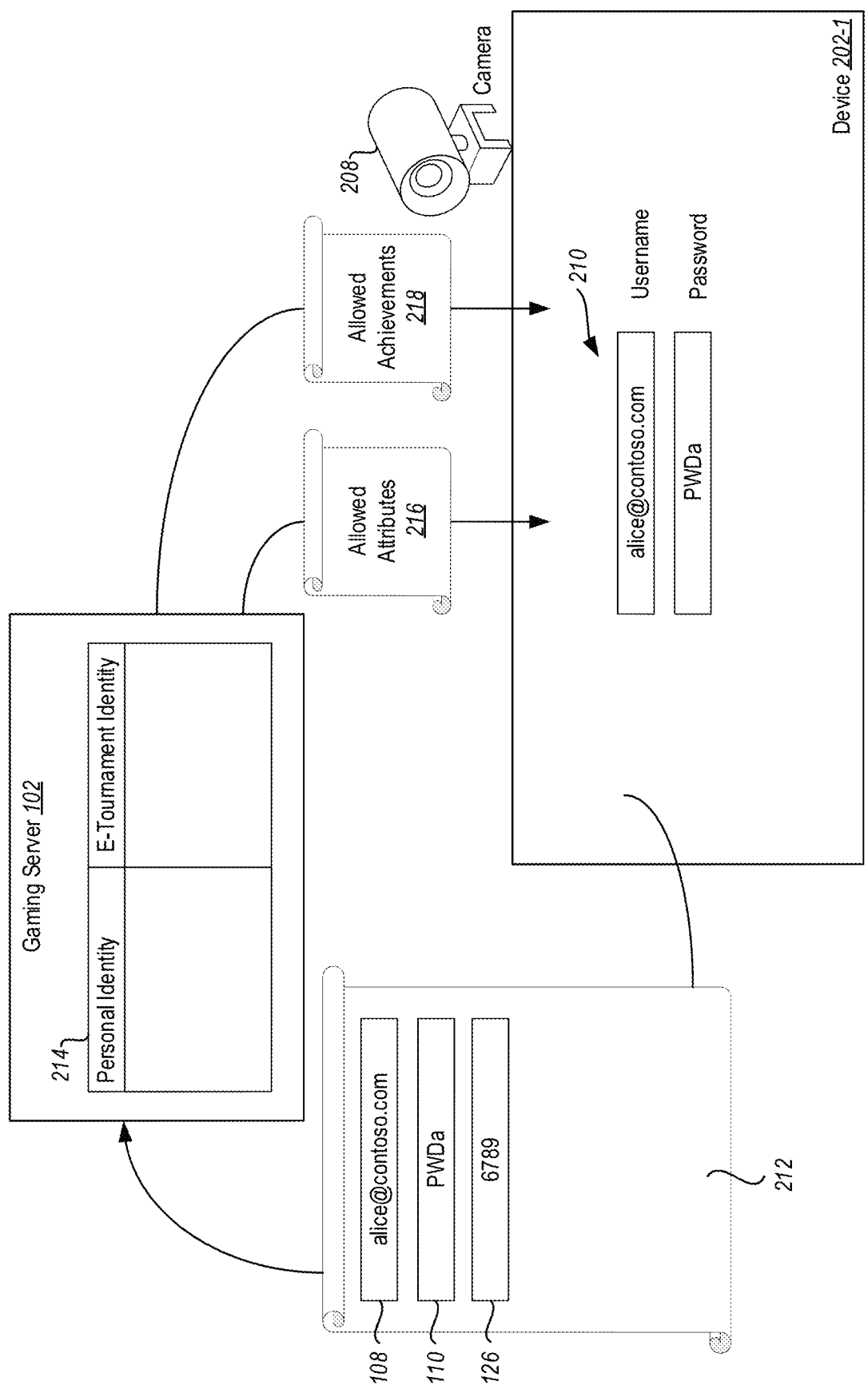
FIG. 3 illustrates a gaming device authenticating to a gaming server for a pre-defined E-tournament identity using a redirected authentication from a personal authentication.

For example, FIG. 3 illustrates a device 202-1 that has had policy applied which forces the device 202-1 to use pointers when authenticating the device 202-1 to an identity. In the example illustrated in FIG. 3, a contestant identifies the determined identity 116 in some fashion. For example, in some embodiments, when the contestant registers for the E-tournament, the contestant may provide the username 108, a gamer tag, the globally unique identifier 106 or other unique identifier that can be used to identify the personal identity 104 to the E-tournament organizer. The E-tournament organizer can then associate the personal identity 104 with the E-tournament identity 116. The E-tournament organizer can provide the contestant with a token which can be used to identify the E-tournament identity 116. For example, in some embodiments, the E-tournament organizer may provide the contestant with a barcode that can be scanned by a camera 208 at the device 202-1. In this way the device 202-1 has information identifying the E-tournament identity 116. In alternative or additional examples, the user may simply be provided with an identifier for the E-tournament identity 116 which the user enters using a text entry interface at the device 202-1. Alternatively or additionally, the contestant may have an RFID token that can be read by a device at the device 202-1. Virtually any usable method of indicating the E-tournament identity 116 to the device 202-1 can be used in spite of the fact that only a limited number of examples have been illustrated herein.

The user further enters their username and password into a user interface 210 displayed at the device 202-1. The device 202-1 will then send a message 212 to the gaming server 102. The message 212 includes the username 108, the password 110, and the globally unique identifier 126 for the E-tournament identity 116. Alternatively, some other identifier may be used such as a gamer tag or other identifier in place of the globally unique identifier 126. As noted above, this message 212 is sent to the gaming server 102. Using the globally unique identifier 126, a pointer can be identified, such as by using a correlation 214 of personal identities with E-tournament identities. This pointer can then be used to authenticate to the E-tournament identity 116 using credentials for the personal identity 104. Once the contestant has been authenticated in this fashion, the contestant can use the device 202-1 to participate in the E-tournament. Note that FIG. 3 also illustrates that allowed attributes 216 and allowed achievements 218 can be applied to the game at the device 202-1 from the attributes 118 and achievements 122 of the E-tournament identity 116. These attributes 118 and achievements 122 may be based on allowed attributes and achievements from the attributes 112 and achievements 114 as described previously herein.

Figure 4:
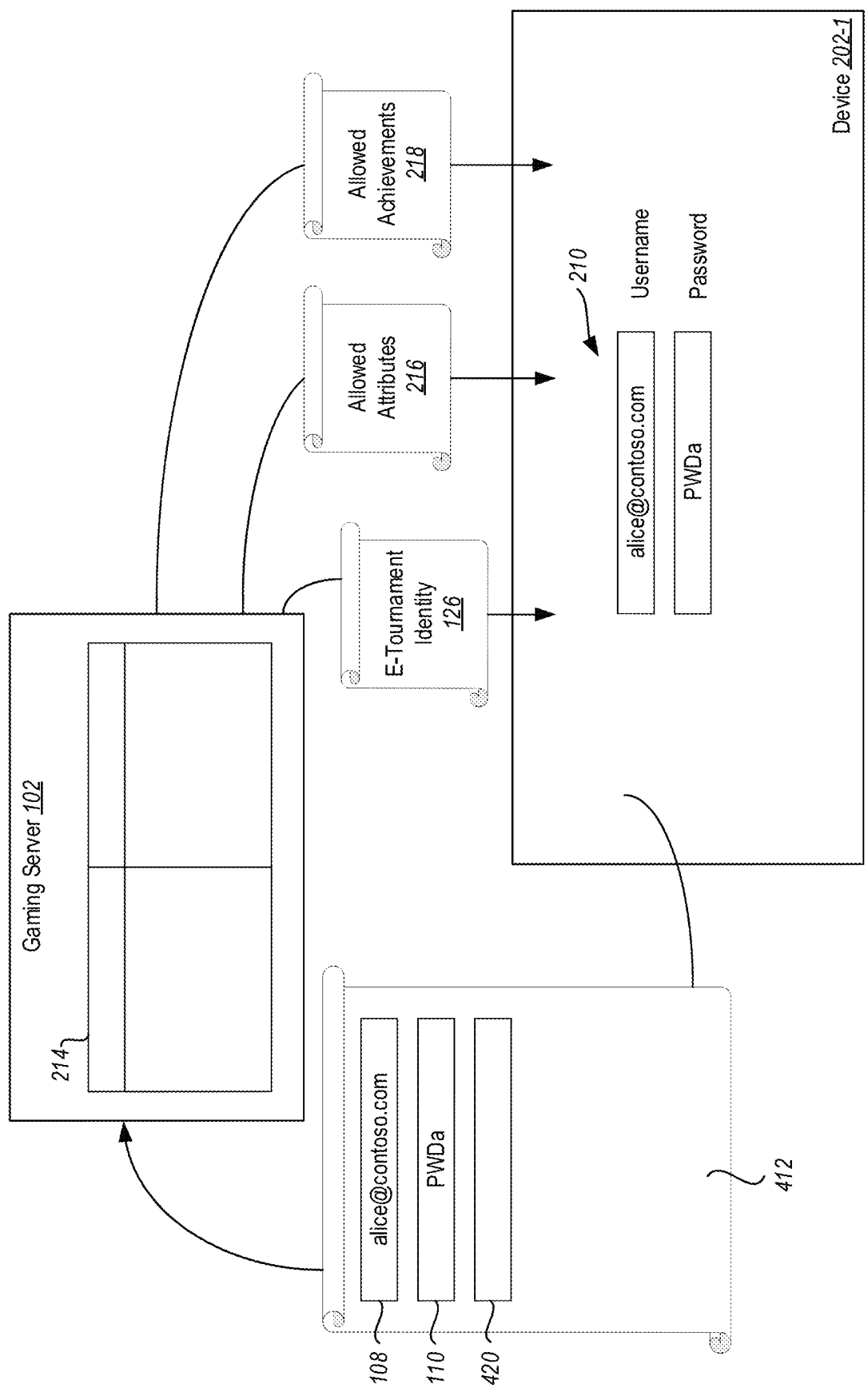
FIG. 4 illustrates a gaming device authenticating to a gaming server for a pre-defined E-tournament identity using a redirected authentication from a personal authentication.

FIG. 4 illustrates an alternative example where the personal identity 104 and E-tournament identity 116 can be correlated at the time the contestant logs into the device 202-1. For example, FIG. 4 illustrates a device 202-1 that has had policy applied which forces the device 202-1 to indicate that some type of redirection should be applied when authenticating the device 202-1 to an identity. In the example illustrated in FIG. 4, the contestant enters their username and password into a user interface 210 displayed at the device 202-1. The device 202-1 will then send a message 412 to the gaming server 102. The message 412 includes the username 108, the password 110 (for the personal identity 104), and an identifier 420 indicating that the device 202-1 should use the authentication information provided for a particular E-tournament. This identifier may be automatically added to the message 412 as a result of the device 202-1 being configured, such as using MDM described above, for use in the particular E-tournament. This message 412 is sent to the gaming server 102.

At the gaming server, the E-tournament identity 116 can be identified and correlated to the personal identity 104. This may be done by randomly assigning an E-tournament identity from the determined identities previously created and reserved for the particular E-tournament. This may be done based on a random assignment of reserved E-tournament identities to personal identities, a previous correlation of reserved E-tournament identities to personal identities, and ordered assignment of reserved determined identities to personal identities (such as selecting a next available E-tournament identity and a contestant with a particular part personal identity attempts to authenticate), or other appropriate assignment of the E-tournament identity to personal identity. Note that as illustrated above, personal identities are correlated to E-tournament identities that the gaming server 102. The E-tournament identities may be created at the time credentials for a personal identity are received at the gaming server 102. For example, the gaming server 102 can create the E-tournament identity 116 when the message 412 is received indicating that the gamer is to be a contestant in the E-tournament using the device 202-1. Personal identities are correlated with the newly generated E-tournament identities at the gaming server 102.

Once the contestant has been authenticated in this fashion, the contestant can use the device 202-1 to participate in the E-tournament. Note that FIG. 4 also illustrates that allowed attributes 216 and allowed achievements 218 can be applied to the game at the device 202-1, if needed, from the attributes 118 and achievements 122 of the E-tournament identity 116. These attributes 118 and achievements 122 may be based on allowed attributes and achievements from the attributes 112 and achievements 114 as described previously herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
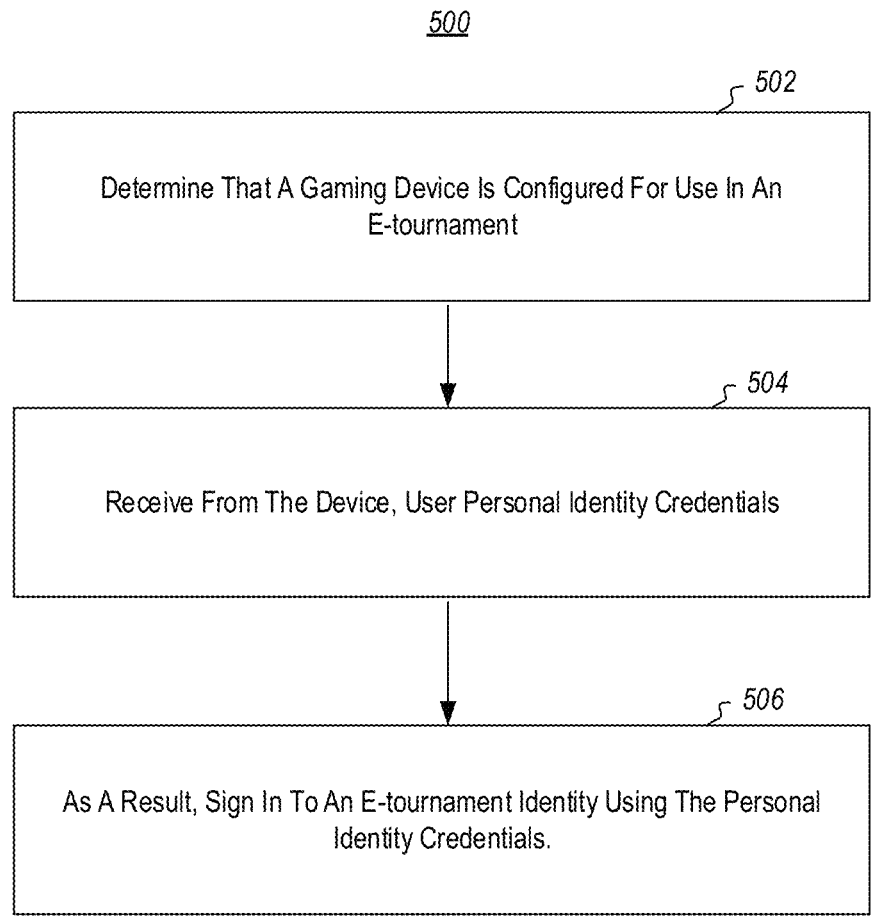
FIG. 5 illustrates a method of authenticating to an E-tournament identity.

Referring now to FIG. 5, a method 500 is illustrated. The method 500 includes acts for authenticating an E-tournament identity using personal identity credentials. The method 500 includes determining that a gaming device is configured for use in an E-tournament (act 502). For example, in some embodiments device may be configured using mobile device management to indicate that the device is going to be used in a particular E-tournament. Settings or parameters may be set on the device, such that the settings can be reviewed to determine that the device is configured for use in an E-tournament. Alternatively or additionally, the pointer with the globally unique identifier 126 included in the message 212, or the identifier 420 received in the message 412 may be used to determine that the gaming device is configured for use in an E-tournament.

The method 500 further includes receiving from the device, user personal identity credentials (act 504). For example, a competitor may enter their own personal identity username and password in the user interface at the device. The device can then provide the username and password to a server for authenticating the competitor to an E-tournament identity.

As a result, the method 500 further includes signing in to an E-tournament identity using the personal identity credentials (act 506). For example, personal identity credentials may be evaluated at a server where the personal identity credentials are correlated with an E-tournament identity, allowing a contestant to the authenticated the E-tournament identity using personal identity credentials.

The method 500 may further include configuring the gaming device for use in the E-tournament using mobile device management (MDM).

The method 500 may further include applying non-competition advantageous attributes, such as a gamertag, name, avatar, posture, etc., of the personal identity to the E-tournament identity. Typically, this is performed while preventing advantageous attributes, which would give the contestant an advantage in gameplay, of the personal identity from being applied to the E-tournament identity.

The method 500 may further include applying approved attributes of the personal identity to the E-tournament identity. That is, certain attributes may be approved for application to the E-Tournament identity while other attributes may be disapproved, and will not be applied to the E-tournament identity.

The method 500 may further include applying non-competition advantageous achievements, such as flair, clothing, badges, etc., of the personal identity to the E-tournament identity. This is typically performed while preventing advantageous achievements, which would give the contestant an advantage in gameplay, of the personal identity from being applied to the E-tournament identity.

The method 500 may further include applying approved achievements of the personal identity to the E-tournament identity. For example, some embodiments may implement an E-tournament with certain skill divisions. In this case, a contestant could bring achievements appropriate for the given skill division.

The method 500 may be practiced where signing in to an E-tournament identity using the personal identity credentials is performed using a directed identifier. Thus, for example, a pointer may be used to identify E-tournament identity from personal identity credentials.

The method 500 may further include exporting achievements earned during the E-tournament back to the personal identity. For example, achievements could be "champion of x tournament", armor, points, money, etc.

The method 500 may further include selecting the E-tournament identity when the personal identity credentials are received. For example, this may be done by randomly or sequentially selecting from a pool of previously created E tournament identities. Alternatively or additionally, E-tournament identities may be created when personal identity credentials are received.

The method 500 may further include creating the E-tournament identity in conjunction with receiving the personal identity credentials.

The method 500 may further include selecting the E-tournament identity based on a previous correlation of the E-tournament identity and the personal identity, when the personal identity credentials are received. For example, when a contestant registers for an E-tournament, E tournament identity may be created as a result of the registration. This example, a user may supply their own personal identity credentials at the time of registration to allow the personal identity credentials to be correlated with the E-tournament identity.

Figure 6:
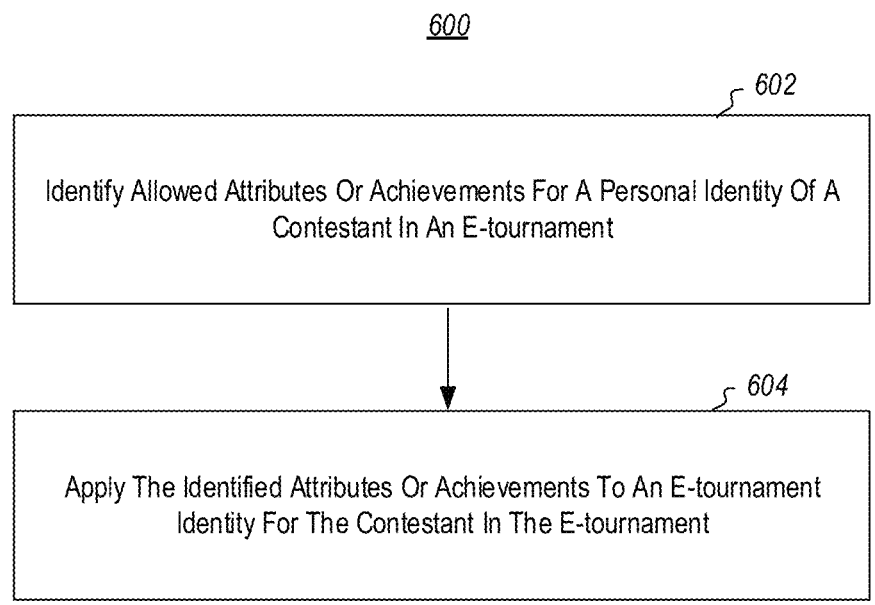
FIG. 6 illustrates a method of importing at least one of personal identity attributes or achievements to an E-tournament.
Figure 7:
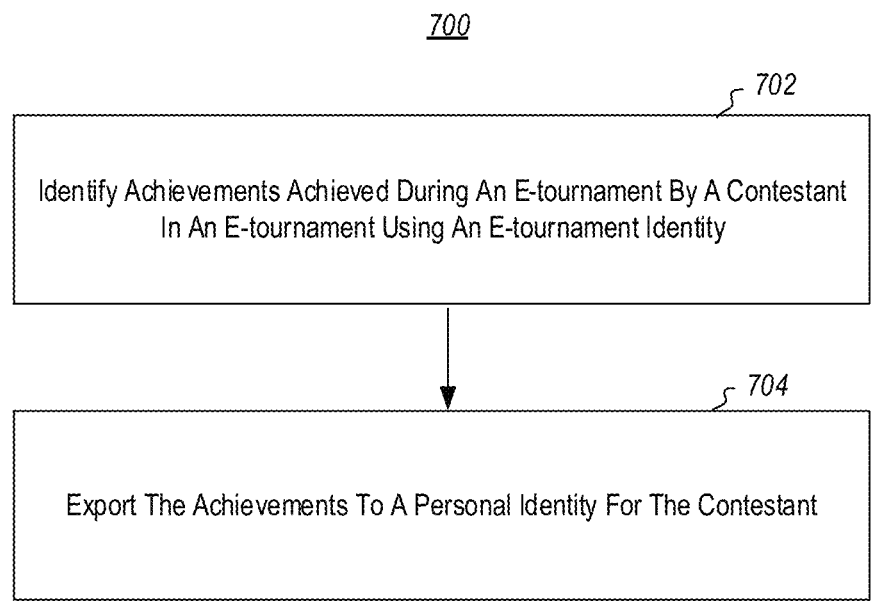
FIG. 7 illustrates a method of exporting achievements achieved by an E-tournament identity achieved in an E-tournament to a personal identity, the method comprising

FIG. 6 illustrates a method of importing at least one of personal identity attributes or achievements to an E-tournament. The method 600 includes identifying allowed attributes or achievements for a personal identity of a contestant in an E-tournament (act 602).

The method 600 further includes applying the identified attributes or achievements to an E-tournament identity for the contestant in the E-tournament (act 604).

A method 700 of exporting achievements achieved by an E-tournament identity achieved in an E-tournament to a personal identity is illustrated. The method 700 includes identifying achievements achieved during an E-tournament by a contestant using an E-tournament identity (act 702).

The method 700 further includes exporting the achievements to a personal identity for the contestant (act 704).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, gaming consoles, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A computer system comprising:
one or more processors; and
one or more computer-readable storage media having stored thereon instructions that are executable by the one or more processors to configure the computer system to authenticate an E-tournament identity using personal identity credentials, including instructions that are executable to configure the computer system to perform at least the following:
receive from a gaming device, user personal identity credentials for a personal identity for a gamer;
receive an identifier for an E-tournament identity, where the E-tournament identity is different from the personal identity, the E-Tournament identity being an identity belonging to an E-Tournament tenant of a gaming server;
as a result, sign the gamer in to the E-tournament tenant as the E-tournament identity using the personal identity credentials; and
issue a token to the gaming device representing the E-tournament identity in the E-tournament tenant allowing the gamer to participate in an E-tournament, at the gaming device, using the E-tournament identity.

2. The computer system of claim 1, wherein the one or more computer-readable storage media further have stored thereon instructions that are executable by the one or more processors to configure the computer system to configure the gaming device for use in the E-tournament using mobile device management.

3. The computer system of claim 1, wherein the one or more computer-readable storage media further have stored thereon instructions that are executable by the one or more processors to configure the computer system to apply non-competition advantageous attributes of the personal identity to the E-tournament identity, while preventing competition advantageous attributes of the personal identity from being applied to the E-Tournament identity.

4. The computer system of claim 1, wherein the one or more computer-readable storage media further have stored thereon instructions that are executable by the one or more processors to configure the computer system to apply approved attributes of the personal identity to the E-tournament identity while preventing non-approved attributes of the personal identity from being applied to the E-Tournament identity.

5. The computer system of claim 1, wherein the one or more computer-readable storage media further have stored thereon instructions that are executable by the one or more processors to configure the computer system to apply non-competition advantageous achievements of the personal identity to the E-tournament identity, while preventing competition advantageous achievements of the personal identity from being applied to the E-Tournament identity.

6. The computer system of claim 1, wherein the one or more computer-readable storage media further have stored thereon instructions that are executable by the one or more processors to configure the computer system to apply approved achievements of the personal identity to the E-tournament identity while preventing non-approved achievements of the personal identity from being applied to the E-Tournament identity.

7. The computer system of claim 1, wherein signing in to an E-tournament identity using the personal identity credentials is performed using a directed identifier.

8. The computer system of claim 1, wherein the one or more computer-readable storage media further have stored thereon instructions that are executable by the one or more processors to configure the computer system to export achievements earned for the E-tournament identity during the E-tournament back to the personal identity.

9. The computer system of claim 1, wherein the one or more computer-readable storage media further have stored thereon instructions that are executable by the one or more processors to configure the computer system to select the E-tournament identity when the personal identity credentials are received.

10. The computer system of claim 1, wherein the one or more computer-readable storage media further have stored thereon instructions that are executable by the one or more processors to configure the computer system to create the E-tournament identity in conjunction with receiving the personal identity credentials.

11. The computer system of claim 1, wherein the one or more computer-readable storage media further have stored thereon instructions that are executable by the one or more processors to configure the computer system to select the E-tournament identity based on a previous correlation of the E-tournament identity and the personal identity, when the personal identity credentials are received.

12. A method of authenticating an E-tournament identity using personal identity credentials, the method comprising:
    receiving from a gaming device, user personal identity credentials for a personal identity for a gamer;
    receiving an identifier for an E-tournament identity, where the E-tournament identity is different from the personal identity, the E-Tournament identity being an identity belonging to an E-Tournament tenant of a gaming server;
    as a result, signing the gamer in to the E-tournament tenant as the E-tournament identity using the personal identity credentials; and
    issuing a token to the gaming device representing the E-tournament identity in the E-tournament tenant allowing the gamer to participate in an E-tournament, at the gaming device, using the E-tournament identity.

13. The method of claim 12, further comprising configuring the gaming device for use in the E-tournament using mobile device management.

14. The method of claim 12, further comprising applying non-competition advantageous attributes of the personal identity to the E-tournament identity, while preventing competition advantageous attributes of the personal identity from being applied to the E-Tournament identity.

15. The method of claim 12, further comprising applying approved attributes of the personal identity to the E-tournament identity while preventing non-approved attributes of the personal identity from being applied to the E-Tournament identity.

16. The method of claim 12, further comprising applying non-competition advantageous achievements of the personal identity to the E-tournament identity, while preventing competition advantageous achievements of the personal identity from being applied to the E-Tournament identity.

17. The method of claim 12, further comprising applying approved achievements of the personal identity to the E-tournament identity while preventing non-approved achievements of the personal identity from being applied to the E-Tournament identity.

18. The method of claim 12, wherein signing in to an E-tournament identity using the personal identity credentials is performed using a directed identifier.

19. The method of claim 12, further comprising exporting achievements earned for the E-tournament identity during the E-tournament back to the personal identity.

20. A gaming server, wherein the gaming server comprises:
    computer storage media, the computer storage media storing a plurality of personal identities for gaming, and a plurality of E-tournament identities for a particular E-tournament;
    wherein the gaming server is configured to:
        receive from gaming devices, user personal identity credentials for personal identities for garners;
        receive identifiers for E-tournament identities, where the E-tournament identities are different from the personal identities, the E-Tournament identities being identities belonging to an E-Tournament tenant of a gaming server;
        as a result, sign a user the gamers in to the E-tournament tenant as the E-tournament identities using the personal identity credentials; and
        issue tokens to the gaming devices representing the E-tournament identities in the E-tournament tenant allowing the gamers to participate in an E-tournament, at the gaming device, using the E-tournament identity.

* * * * *